(12) United States Patent
Kota et al.

(10) Patent No.: US 12,536,577 B2
(45) Date of Patent: Jan. 27, 2026

(54) SYSTEM AND METHOD FOR CONTEXT BASED RECOMMENDATIONS

(71) Applicant: JPMorgan Chase Bank, N.A., New York, NY (US)

(72) Inventors: Krishna Kota, Garnet Valley, PA (US); Sunita Kumar, Glen Mills, PA (US); Anupam Arora, Middletown, DE (US); Preethi Motakuri, Bear, DE (US); Nikhita Devgan, Wilmington, DE (US); Rabeet Butt, Belcamp, MD (US); Saumil Patel, Bear, DE (US); Antonio Pires Ferreira, Hodgenville, KY (US); Vishnuvardhan Pondugula, Garnet Valley, PA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 312 days.

(21) Appl. No.: 18/208,001

(22) Filed: Jun. 9, 2023

(65) Prior Publication Data

US 2024/0013278 A1     Jan. 11, 2024

Related U.S. Application Data

(60) Provisional application No. 63/367,851, filed on Jul. 7, 2022.

(51) Int. Cl.
*G06Q 30/00* (2023.01)
*G06Q 30/0201* (2023.01)
*G06Q 30/0601* (2023.01)

(52) U.S. Cl.
CPC ..... *G06Q 30/0631* (2013.01); *G06Q 30/0201* (2013.01)

(58) Field of Classification Search
CPC ................................. G06Q 30/06–08
See application file for complete search history.

(56) References Cited

U.S. PATENT DOCUMENTS

| | | | |
|---|---|---|---|
| 11,113,734 B2 * | 9/2021 | Dhawan | G06Q 30/0255 |
| 2019/0235641 A1 * | 8/2019 | Goldberg | G06F 3/0482 |

(Continued)

OTHER PUBLICATIONS

Imen Akermi, Rim Faiz. Situation Assessment for Non-Intrusive Recommendation. 12th IEEE International Conference on Research Challenges in Information Science (RCIS 2018), May 2018, Nantes, France. pp. 1-12. ffhal-02319695 (Year: 2018).*

*Primary Examiner* — Ethan D Civan
(74) *Attorney, Agent, or Firm* — GREENBLUM & BERNSTEIN, P.L.C.

(57) ABSTRACT

Various methods, apparatuses/systems, and media for automatically providing context-based product recommendation are disclosed. A processor establishes a communication link between an application and one or more Internet of Things (IoT) devices wearable by a customer having an account relationship with an institution; receives input data from the IoT devices; assesses surroundings of the customer based on the received input data; generates surroundings data based on the assessed surroundings of the customer; generates customer context data based on the received input data and the surroundings data; implements a classification algorithm to identify products with matching offerings provided by the institution corresponding to the generated customer context data; receives input corresponding to customer consent to receive the identified products; and displays, in response to receiving the customer consent, the identified products onto the application via a predefined communication channel.

20 Claims, 8 Drawing Sheets

(56) References Cited

U.S. PATENT DOCUMENTS

2019/0340649 A1* 11/2019 Ayush .................. G06V 10/255
2022/0391874 A1* 12/2022 Pezewski ............... G06Q 20/26

* cited by examiner

SYSTEM AND METHOD FOR CONTEXT BASED RECOMMENDATIONS

CROSS-REFERENCE TO RELATED APPLICATIONS

This application claims the benefit of priority from U.S. Provisional Patent Application No. 63/367,851, filed Jul. 7, 2022, which is herein incorporated by reference in its entirety.

TECHNICAL FIELD

This disclosure generally relates to data processing, and, more particularly, to methods and apparatuses for implementing a language and platform agnostic context-based recommendation module for predicting customer's need and providing specific product recommendations through video/image recognition and natural language processing of the surroundings.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Today, a wide variety of business functions are commonly supported by software applications and tools, i.e., business intelligence tools. For instance, software has been directed to data monitoring, performance analysis, project tracking, and competitive analysis, to name but a few. The Internet of Things (IoT) describes the network of physical objects ("things") that are embedded with sensors, software, and other technologies for the purpose of connecting and exchanging data with other devices and systems over the internet. Over the past few years, IoT has become one of the most important technologies of the twenty first century. Now that we can connect everyday objects, such as kitchen appliances, cars, thermostats, baby monitors, etc., to the internet via embedded devices, seamless communication is possible between people, processes, and things. These devices may range from ordinary household objects to sophisticated industrial tools. Some IoT devices may be wearable by a user.

For example, most customers of a financial institution (e.g., bank) may now have one or more wearable IoT devices, such as smart glasses, smart headsets (e.g., Bluetooth headphones), smart vehicles, cameras, etc. Smart glasses and cameras can provide video feed of surroundings, Bluetooth headphones can provide audio feed of phone calls/surroundings. Today, customers are making financial decisions every day, often customers may not know that bank offers a superior financial product. However, conventional tools lack the capabilities of utilizing output data from these IoT devices in an integrated fashion, thereby failing to accurately determine the context of the customer, and therefore, failing to provide recommendations for products based on the context of the customer.

Thus, there is a need for an advanced tool or application that can utilize these IoT devices to accurately determine the context of the customer and provide a specific product or partner offering.

SUMMARY

The present disclosure, through one or more of its various aspects, embodiments, and/or specific features or sub-components, provides, among other features, various systems, servers, devices, methods, media, programs, and platforms for implementing a platform and language agnostic context-based recommendation module for automatically predicting customer's need and providing specific product recommendations through video/image recognition and natural language processing of the surroundings, thereby improving customer's experience and financial life, saving the customer's money and time to research and process, but the disclosure is not limited thereto.

According to an aspect of the present disclosure, a method for automatically providing context-based product recommendation by utilizing one or more processors along with allocated memory is disclosed. The method may include: establishing a communication link between an application and one or more IoT devices, wherein the one or more IoT devices are configured to be wearable by a customer having an account relationship with an institution; receiving input data from said one or IoT devices; assessing surroundings of the customer based on the received input data; generating surroundings data based on the assessed surroundings of the customer; generating customer context data based on the received input data and the surroundings data; implementing a classification algorithm to identify products with matching offerings provided by the institution corresponding to the generated customer context data; receiving input corresponding to customer consent to receive the identified products; and displaying, in response to receiving the customer consent, the identified products onto the application via a predefined communication channel.

According to a further aspect of the present disclosure, the input data may include one or more of the following data: sensory inputs data, positional data, and contexts data, but the disclosure is not limited thereto.

According to another aspect of the present disclosure, the institution may be a financial institution, and the method may further include: filtering non-financial use cases data prior to generating the customer context data.

According to yet another aspect of the present disclosure, in assessing the surroundings of the customer, the method may further include: integrating a plurality of data each received from a corresponding communication channel of the one or more IoT devices.

According to an aspect of the present disclosure, the one or more IoT devices may include smart glasses with embedded cameras, and the method may further include: receiving video feed data of the surroundings of the customer from the smart glasses.

According to a further aspect of the present disclosure, the one or more IoT devices may include a global positioning device, and the method may further include: receiving customer location data from the global positioning device.

According to another aspect of the present disclosure, the one or more IoT devices may include a visual positioning device configured to provide imagery-based positioning data of the customer, and the method may further include: receiving visual positioning data of the customer from the visual positioning device based on imagery of the surroundings of the customer.

According to yet another aspect of the present disclosure, the one or more IoT devices may include smart wearable Bluetooth headphones with pre-determined image recognition capabilities and executable natural language processing pattern recognition algorithms.

According to an aspect of the present disclosure, the application may be running natively on each of said one or more IoT devices.

According to a further aspect of the present disclosure, in generating the surroundings data, the method may further include: implementing a natural language processing algorithm on assessed surroundings data of the customer received through the one or more IoT devices.

According to another aspect of the present disclosure, the predefined communication channel may include one or more of the following channels: augmented reality communication channel, virtual assistant communication channel; push notifications communication channel, and audio communication channel of the IoT devices, but the disclosure is not limited thereto.

According to yet another aspect of the present disclosure, the method may further include: implementing a product specific regression algorithm to obtain specific product offering corresponding to the identified products.

According to a further aspect of the present disclosure, the product specific algorithm may include one or more of the following algorithms: card algorithms, deposits algorithms, automobile algorithms, home loan algorithms, operations algorithms, and student loan algorithms, but the disclosure is not limited thereto.

According to an aspect of the present disclosure, a system for automatically providing context-based product recommendation is disclosed. The system may include: a processor; and a memory operatively connected to the processor via a communication interface, the memory storing computer readable instructions, when executed, may cause the processor to: establish a communication link between an application and one or more IoT devices, wherein the one or more IoT devices are configured to be wearable by a customer having an account relationship with an institution; receive input data from said one or more IoT devices; assess surroundings of the customer based on the received input data; generate surroundings data based on the assessed surroundings of the customer; generate customer context data based on the received input data and the surroundings data; implement a classification algorithm to identify products with matching offerings provided by the institution corresponding to the generated customer context data; receive input corresponding to customer consent to receive the identified products; and display, in response to receiving the customer consent, the identified products onto the application via a predefined communication channel.

According to another aspect of the present disclosure, the institution may be a financial institution, and the processor may be further configured to: filter non-financial use cases data prior to generating the customer context data.

According to yet another aspect of the present disclosure, in assessing the surroundings of the customer, the processor may be further configured to: integrate a plurality of data each received from a corresponding communication channel of the one or more IoT devices.

According to an aspect of the present disclosure, the one or more IoT devices may include smart glasses with embedded cameras, and the processor may be further configured to: receive video feed data of the surroundings of the customer from the smart glasses.

According to a further aspect of the present disclosure, the one or more IoT devices may include a global positioning device, and the processor may be further configured to: receive customer location data from the global positioning device.

According to another aspect of the present disclosure, the one or more IoT devices may include a visual positioning device configured to provide imagery-based positioning data of the customer, and the processor may be further configured to: receive visual positioning data of the customer from the visual positioning device based on imagery of the surroundings of the customer.

According to a further aspect of the present disclosure, in generating the surroundings data, the processor may be further configured to: implement a natural language processing algorithm on assessed surroundings data of the customer received through the one or more IoT devices.

According to yet another aspect of the present disclosure, the processor may be further configured to: implement a product specific regression algorithm to obtain specific product offering corresponding to the identified products.

According to yet another aspect of the present disclosure, a non-transitory computer readable medium configured to store instructions for automatically providing context-based product recommendation is disclosed. The instructions, when executed, may cause a processor to perform the following: establishing a communication link between an application and one or more IoT devices, wherein the one or more IoT devices are configured to be wearable by a customer having an account relationship with an institution; receiving input data from said one or more IoT devices; assessing surroundings of the customer based on the received input data; generating surroundings data based on the assessed surroundings of the customer; generating customer context data based on the received input data and the surroundings data; implementing a classification algorithm to identify products with matching offerings provided by the institution corresponding to the generated customer context data; receiving input corresponding to customer consent to receive the identified products; and displaying, in response to receiving the customer consent, the identified products onto the application via a predefined communication channel.

According to another aspect of the present disclosure, the institution may be a financial institution, and the instructions, when executed, may further cause the processor to perform the following: filtering non-financial use cases data prior to generating the customer context data.

According to yet another aspect of the present disclosure, in assessing the surroundings of the customer, the instructions, when executed, may further cause the processor to perform the following: integrating a plurality of data each received from a corresponding communication channel of the one or more IoT devices.

According to an aspect of the present disclosure, the one or more IoT devices may include smart glasses with embedded cameras, and the instructions, when executed, may further cause the processor to perform the following: receiving video feed data of the surroundings of the customer from the smart glasses.

According to a further aspect of the present disclosure, the one or more IoT devices may include a global positioning device, and the instructions, when executed, may further cause the processor to perform the following: receiving customer location data from the global positioning device.

According to another aspect of the present disclosure, the one or more IoT devices may include a visual positioning device configured to provide imagery-based positioning data of the customer, and the instructions, when executed, may further cause the processor to perform the following: receiving visual positioning data of the customer from the visual positioning device based on imagery of the surroundings of the customer, wherein the one or more IoT devices may include smart wearable Bluetooth headphones with predetermined image recognition capabilities and executable natural language processing pattern recognition algorithms, and wherein the application may be running natively on each of said one or more IoT devices.

According to a further aspect of the present disclosure, in generating the surroundings data, the instructions, when executed, may further cause the processor to perform the following: implementing a natural language processing algorithm on assessed surroundings data of the customer received through the one or more IoT devices.

According to yet another aspect of the present disclosure, the instructions, when executed, may further cause the processor to perform the following: implementing a product specific regression algorithm to obtain specific product offering corresponding to the identified products.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
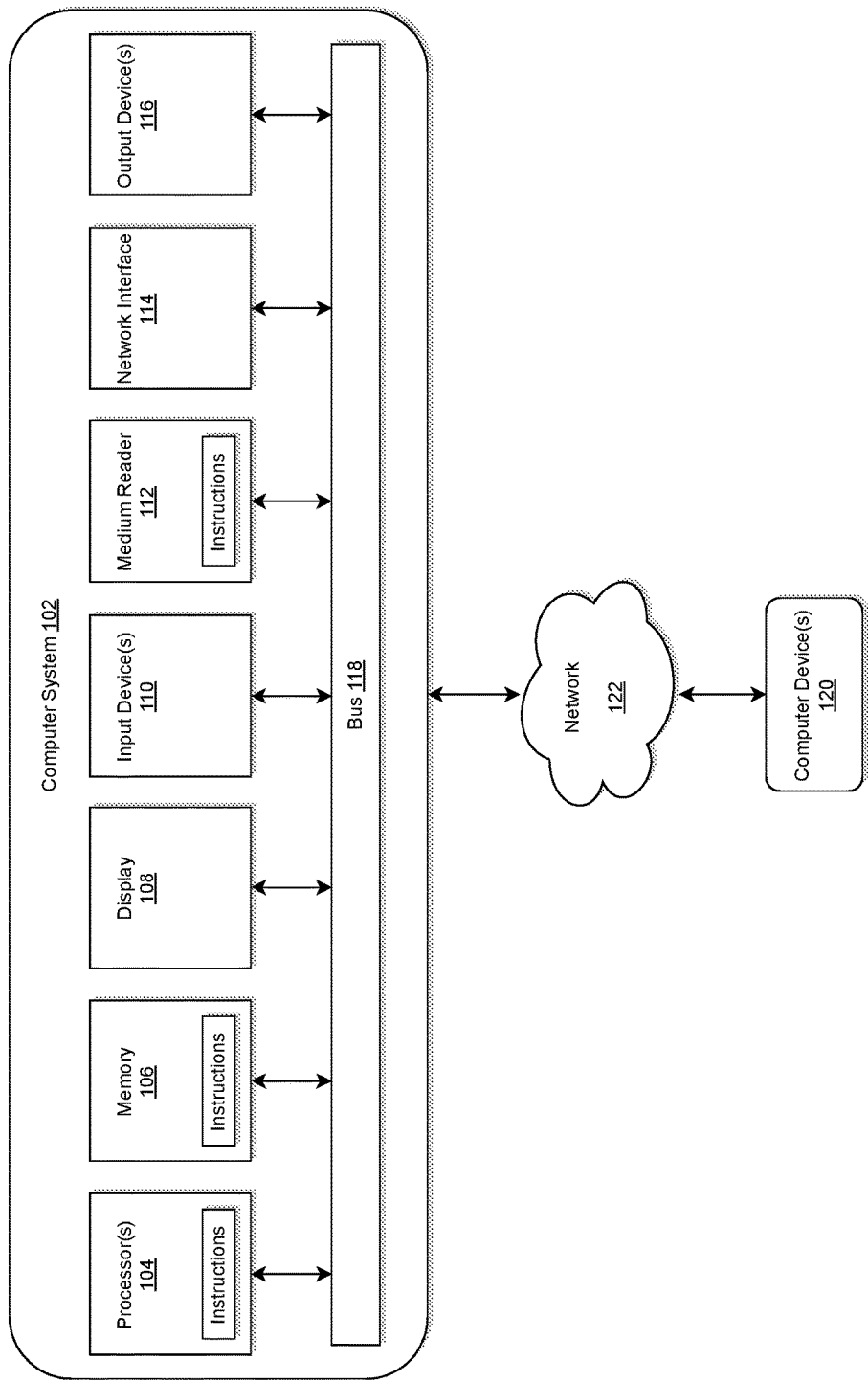
FIG. 1 illustrates a computer system for implementing a platform and language agnostic context-based recommendation module that may be configured for automatically predicting customer's need and providing specific product recommendations through video/image recognition and natural language processing of the surroundings in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system 100 for use in implementing a platform and language agnostic context-based recommendation module that may be configured for automatically predicting customer's need and providing specific product recommendations through video/image recognition and natural language processing of the surroundings in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, a visual positioning system (VPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 104 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

According to exemplary embodiments, the context-based recommendation module may be platform and language agnostic that may allow for consistent easy orchestration and passing of data through various components to output a desired result. Since the disclosed process, according to exemplary embodiments, is platform and language agnostic, the context-based recommendation module may be independently tuned or modified for optimal performance without affecting the configuration or data files. The configuration or data files, according to exemplary embodiments, may be written using JSON, but the disclosure is not limited thereto. For example, the configuration or data files may easily be extended to other readable file formats such as XML, YAML, etc., or any other configuration based languages.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
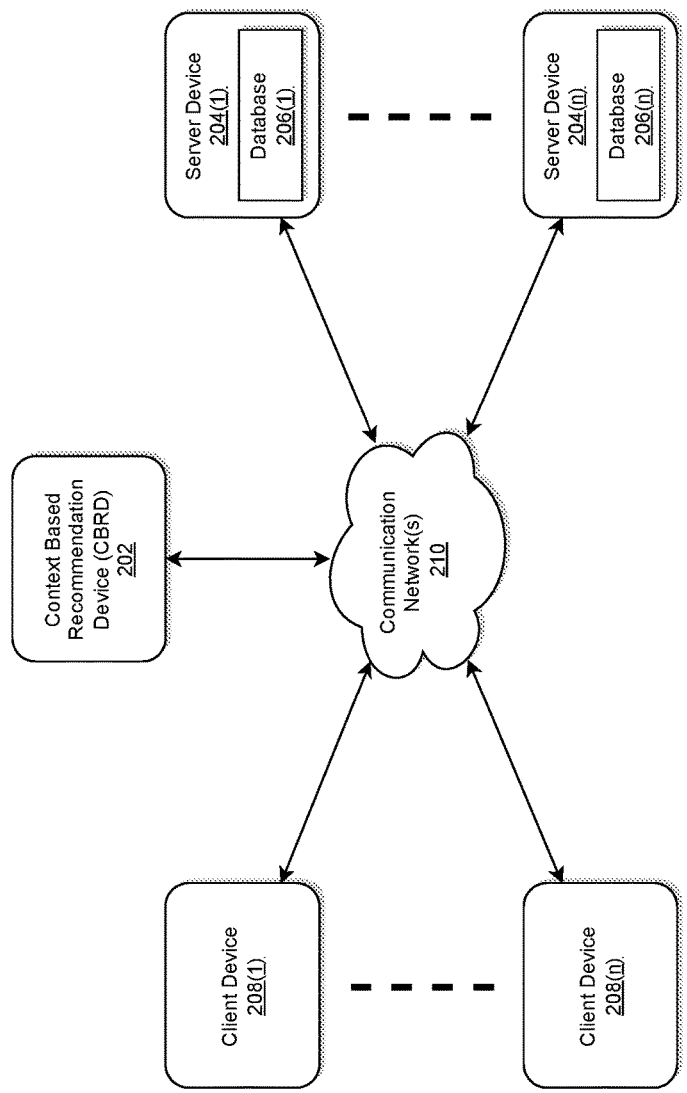
FIG. 2 illustrates an exemplary diagram of a network environment with a platform and language agnostic context-based recommendation device in accordance with an exemplary embodiment.

Referring to FIG. 2, a schematic of an exemplary network environment 200 for implementing a platform and language context-based recommendation device (CBRD) of the instant disclosure is illustrated.

According to exemplary embodiments, the above-described problems associated with conventional tools may be overcome by implementing an CBRD 202 as illustrated in FIG. 2 that may be configured for implementing a platform and language agnostic context-based recommendation module for automatically predicting customer's need and providing specific product recommendations through video/image recognition and natural language processing of the surroundings, thereby improving customer's experience and financial life, saving the customer's money and time to research and process, but the disclosure is not limited thereto.

The CBRD 202 may be the same or similar to the computer system 102 as described with respect to FIG. 1.

The CBRD 202 may store one or more applications that can include executable instructions that, when executed by the CBRD 202, cause the CBRD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the CBRD 202 itself, may be located in virtual server(s) running in a cloud-based computing environment rather than being tied to one or more specific physical network computing devices. Also, the application(s) may be running in one or more virtual machines (VMs) executing on the CBRD 202. Additionally, in one or more embodiments of this technology, virtual machine(s) running on the CBRD 202 may be managed or supervised by a hypervisor.

In the network environment 200 of FIG. 2, the CBRD 202 is coupled to a plurality of server devices 204(1)-204(n) that hosts a plurality of databases 206(1)-206(n), and also to a plurality of client devices 208(1)-208(n) via communication network(s) 210. A communication interface of the CBRD 202, such as the network interface 114 of the computer system 102 of FIG. 1, operatively couples and communicates between the CBRD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the CBRD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The CBRD 202 may be a standalone device or integrated with one or more other devices or apparatuses, such as one or more of the server devices 204(1)-204(n), for example. In one particular example, the CBRD 202 may be hosted by one of the server devices 204(1)-204(n), and other arrangements are also possible. Moreover, one or more of the devices of the CBRD 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the CBRD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the CBRD 202 that may efficiently provide a platform for implementing a platform and language agnostic context-based recommendation module for automatically predicting customer's need and providing specific product recommendations through video/image recognition and natural language processing of the surroundings, thereby improving customer's experience and financial life, saving the customer's money and time to research and process, but the disclosure is not limited thereto.

The client devices 208(1)-208(n) may run interface applications, such as standard web browsers or standalone client applications, which may provide an interface to communicate with the CBRD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the CBRD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the CBRD 202, the server devices 204(1)-204(n), or the client devices 208(1)-208(n), for example, may be configured to operate as virtual instances on the same physical machine. For example, one or more of the CBRD 202, the server devices 204(1)-204(n), or the client devices 208(1)-208(n) may operate on the same physical device rather than as separate devices communicating through communication network(s) 210. Additionally, there may be more or fewer CBRDs 202, server devices 204(1)-204(n), or client devices 208(1)-208(n) than illustrated in FIG. 2. According to exemplary embodiments, the CBRD 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
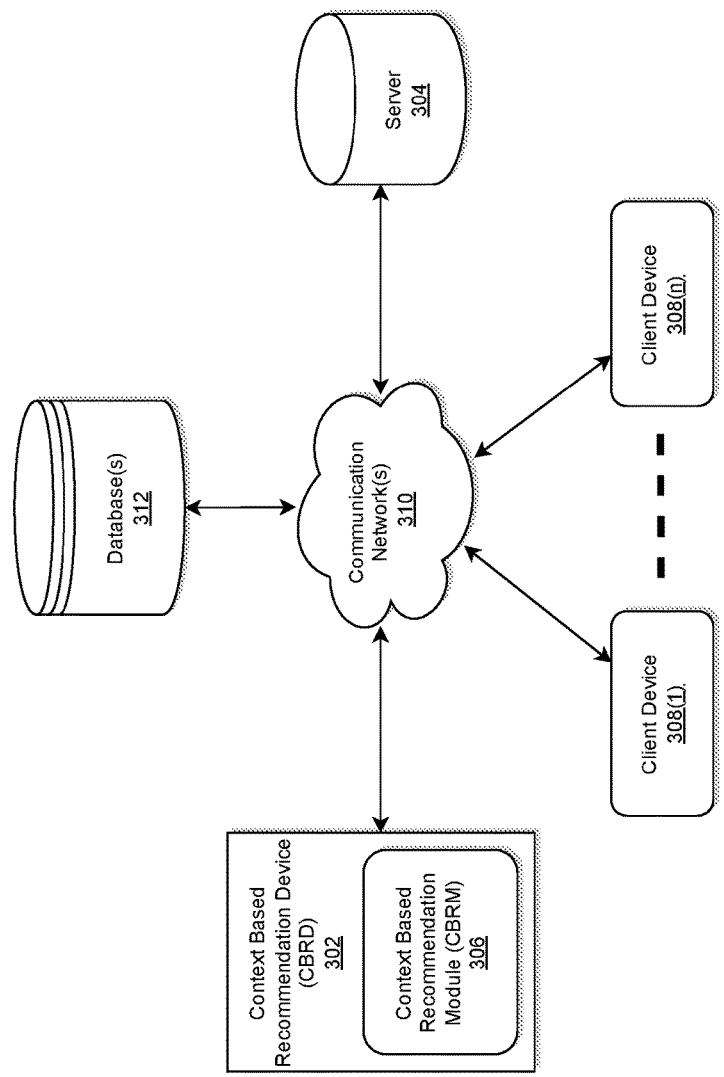
FIG. 3 illustrates a system diagram for implementing a platform and language agnostic context-based recommendation device having a platform and language agnostic multi-armed bandit application module in accordance with an exemplary embodiment.

FIG. 3 illustrates a system diagram for implementing an CBRD having a platform and language agnostic context-based recommendation module (CBRM) in accordance with an exemplary embodiment.

As illustrated in FIG. 3, the system 300 may include a CBRD 302 within which an CBRM 306 is embedded, a server 304, a database(s) 312, a plurality of client devices 308(1) . . . 308(n), and a communication network 310.

According to exemplary embodiments, the CBRD 302 including the CBRM 306 may be connected to the server 304, and the database(s) 312 via the communication network 310. The CBRD 302 may also be connected to the plurality of client devices 308(1) . . . 308(n) via the communication network 310, but the disclosure is not limited thereto.

According to exemplary embodiment, the CBRD 302 is described and shown in FIG. 3 as including the CBRM 306, although it may include other rules, policies, modules, databases, or applications, for example. According to exemplary embodiments, the database(s) 312 may be configured to store ready to use modules written for each API for all environments. Although only one database is illustrated in FIG. 3, the disclosure is not limited thereto. Any number of desired databases may be utilized for use in the disclosed invention herein. The database(s) may be a mainframe database, a log database that may that may produce programming for searching, monitoring, and analyzing machine-generated data via a web interface, etc., but the disclosure is not limited thereto.

According to exemplary embodiments, the CBRM 306 may be configured to receive real-time feed of data from the plurality of client devices 308(1) . . . 308(n) via the communication network 310.

As will be described below, the CBRM 306 may be configured to: establish a communication link between an application and one or more Internet of Things (IoT) devices, wherein the one or more IoT devices are configured to be wearable by a customer having an account relationship with an institution; receive input data from said one or more Internet of Things (IoT) devices; assess surroundings of the customer based on the received input data; generate surroundings data based on the assessed surroundings of the customer; generate customer context data based on the received input data and the surroundings data; implement a classification algorithm to identify products with matching offerings provided by the institution corresponding to the generated customer context data; receive input corresponding to customer consent to receive the identified products; and display, in response to receiving the customer consent, the identified products onto the application via a predefined communication channel, but the disclosure is not limited thereto.

The plurality of client devices 308(1) . . . 308(n) are illustrated as being in communication with the CBRD 302. In this regard, the plurality of client devices 308(1) . . . 308(n) may be "clients" (e.g., customers) of the CBRD 302 and are described herein as such. Nevertheless, it is to be known and understood that the plurality of client devices 308(1) . . . 308(n) need not necessarily be "clients" of the CBRD 302, or any entity described in association therewith herein. Any additional or alternative relationship may exist between either or both of the plurality of client devices 308(1) . . . 308(n) and the CBRD 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the CBRD 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The CBRD 302 may be the same or similar to the CBRD 202 as described with respect to FIG. 2, including any features or combination of features described with respect thereto.

Figure 4:
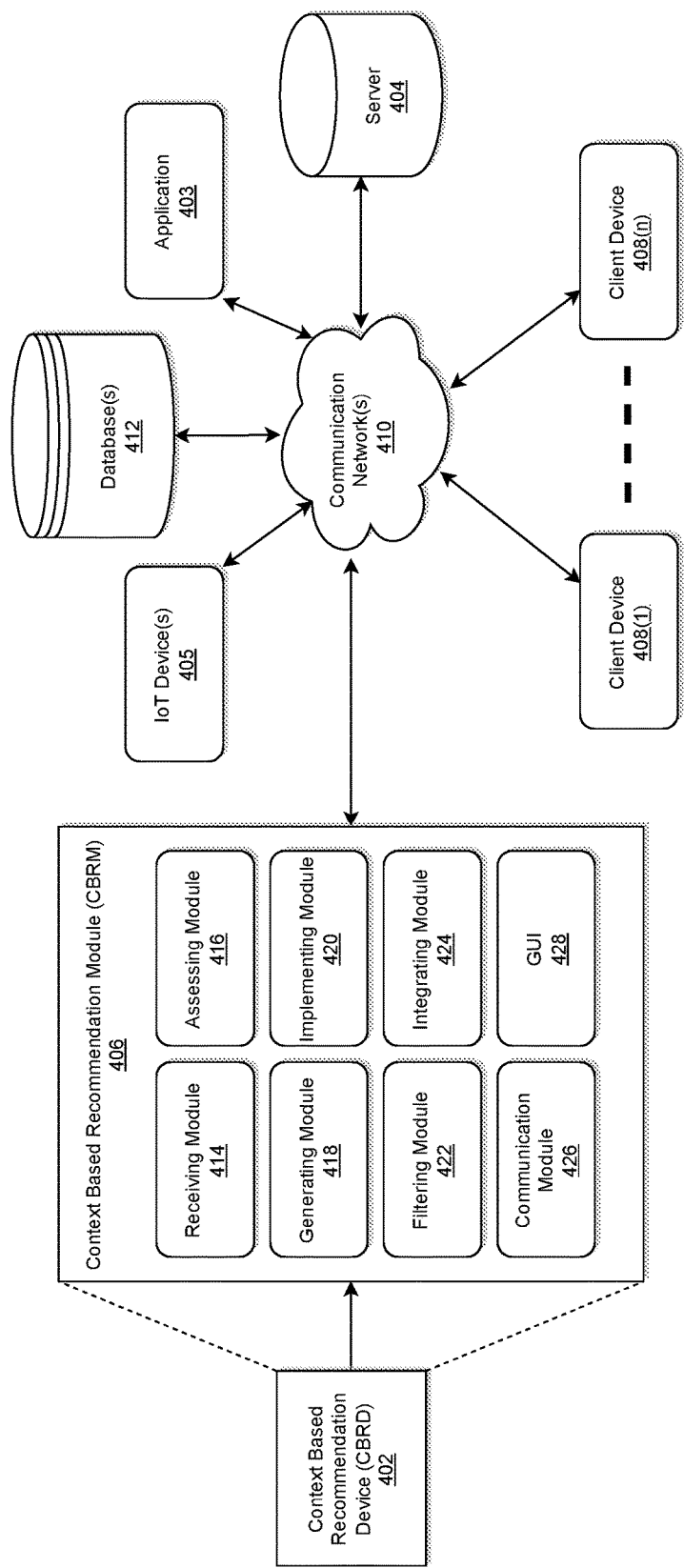
FIG. 4 illustrates a system diagram for implementing a platform and language agnostic context-based recommendation module of FIG. 3 in accordance with an exemplary embodiment.

FIG. 4 illustrates a system diagram for implementing a CBRM of FIG. 3 in accordance with an exemplary embodiment.

According to exemplary embodiments, the system 400 may include a platform and language agnostic CBRD 402 within which a platform and language agnostic CBRM 406 is embedded, an application 403, a server 404, IoT device(s) 405, database(s) 412, and a communication network 410.

According to exemplary embodiments, the CBRD 402 including the CBRM 406 may be connected to the application 403, the server 404, the IoT device(s) 405, and the database(s) 412 via the communication network 410. The CBRD 402 may also be connected to the plurality of client devices 408(1)-408(n) via the communication network 410, but the disclosure is not limited thereto. The CBRM 406, the server 404, the plurality of client devices 408(1)-408(n), the database(s) 412, the communication network 410 as illustrated in FIG. 4 may be the same or similar to the CBRM 306, the server 304, the plurality of client devices 308(1)-308(n), the database(s) 312, the communication network 310, respectively, as illustrated in FIG. 3.

According to exemplary embodiments, as illustrated in FIG. 4, the CBRM 406 may include a receiving module 414, an assessing module 416, a generating module 418, an implementing module 420, a filtering module 422, an integrating module 424, a communication module 426, and a GUI 428. According to exemplary embodiments, interactions and data exchange among these modules included in the CBRM 406 and the IoT device(s) 405 and the application 403 provide the advantageous effects of the disclosed invention. Functionalities of each modules of FIG. 4 will be described in details below with reference to FIGS. 5-7.

According to exemplary embodiments, each of the receiving module 414, assessing module 416, generating module 418, implementing module 420, filtering module 422, integrating module 424, and the communication module 426 of the CBRM 406 may be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies.

According to exemplary embodiments, each of the receiving module 414, assessing module 416, generating module 418, implementing module 420, filtering module 422, integrating module 424, and the communication module 426 of the CBRM 406 may be implemented by microprocessors or similar, and may be programmed using software (e.g., microcode) to perform various functions discussed herein and may optionally be driven by firmware and/or software.

Alternatively, according to exemplary embodiments, each of the receiving module 414, assessing module 416, generating module 418, implementing module 420, filtering module 422, integrating module 424, and the communication module 426 of the CBRM 406 may be implemented by dedicated hardware, or as a combination of dedicated hardware to perform some functions and a processor (e.g., one or more programmed microprocessors and associated circuitry) to perform other functions.

According to exemplary embodiments, each of the receiving module 414, assessing module 416, generating module 418, implementing module 420, filtering module 422, integrating module 424, and the communication module 426 of the CBRM 406 may be called via corresponding API.

The process may be executed via the communication module 426 and the communication network 410, which may comprise plural networks as described above. For example, in an exemplary embodiment, the various components of the CBRM 406 may communicate with the server 404, and the database(s) 412 via the communication module 426 and the communication network 410. Of course, these embodiments are merely exemplary and are not limiting or exhaustive.

Figure 5:
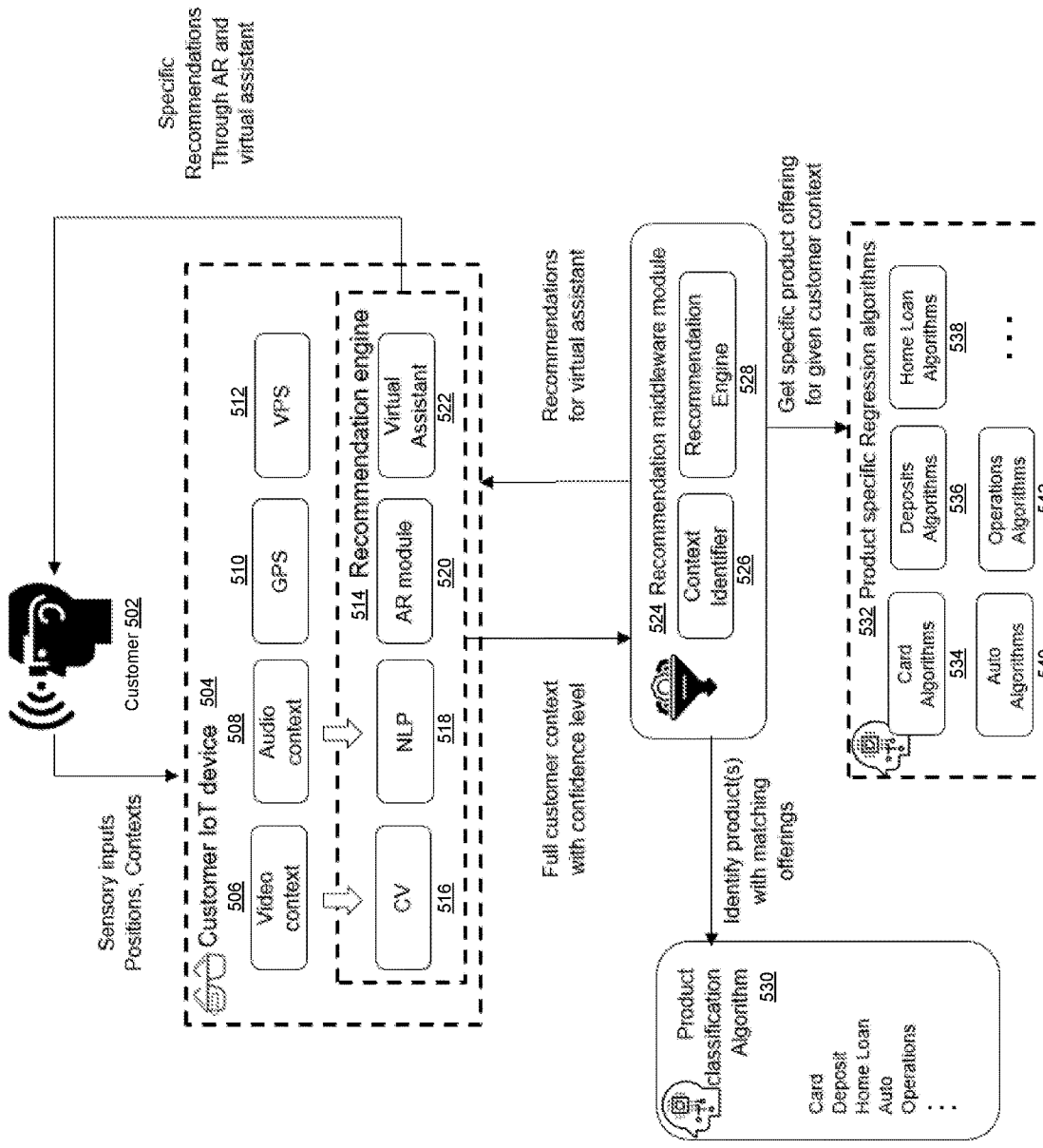
FIG. 5 illustrates an exemplary architecture diagram implemented by the platform and language agnostic context-based recommendation module of FIG. 4 in accordance with an exemplary embodiment.

FIG. 5 illustrates an exemplary architecture diagram 500 implemented by the platform and language agnostic CBRM 406 of FIG. 4 in accordance with an exemplary embodiment. As illustrated in FIG. 5, a customer IoT device 504 may include a video context block 506, an audio context block 508, a GPS 510, and a VPS 512, but the disclosure is not limited thereto. The IoT device 504 may communicate with a recommendation engine 514. According to exemplary embodiments, the recommendation engine 514 may include a CV block 516, a natural language processing (NLP) block 518, an augmented reality (AR) module 520, and a virtual (VR) assistant block 522. Output (e.g., full customer context data with confidence level of a customer 502 who is wearing and/or holding the IoT device 504) from the recommendation engine 514 may be input to a recommendation middleware module 524.

According to exemplary embodiments, the recommendation middleware module 524 may include a context identifier 526 and another recommendation engine 528, but the disclosure is not limited thereto. The recommendation engine 528 may be the same or similar to the recommendation engine 514. Output from the recommendation middleware module may be input to the customer IoT device 504.

According to exemplary embodiments the context identifier 526 of the recommendation middleware module 524 may be configured to implement a product classification algorithm 530 to identify products with matching offerings. According to exemplary embodiments the recommendation engine 528 of the recommendation middleware module 524 may obtain specific product offerings for a given customer context by implementing product specific regression algorithms 532. The product specific regression algorithms 532 may include card algorithms 534 to obtain card specific recommendation data; deposits algorithms 536 to obtain deposits specific recommendation data; home loan algorithms 538 to obtain home loan specific recommendation data; auto algorithms 540 to obtain automobile specific recommendation data; operations algorithms 542 to obtain operations specific recommendation data, etc., but the disclosure is not limited thereto.

According to exemplary embodiments the product specific recommendations data received by the recommendation middleware module 524 by implementing the above-described product specific regression algorithms 532 may be input to the customer IoT device 504, more specifically, to the AR module 520 and/or the VR assistant block 522 of the recommendation engine 514. The AR module 520 and/or the VR assistant block 522 may send the specific recommendations data to the IoT device 504 worn or held by the customer 502.

Figure 6:
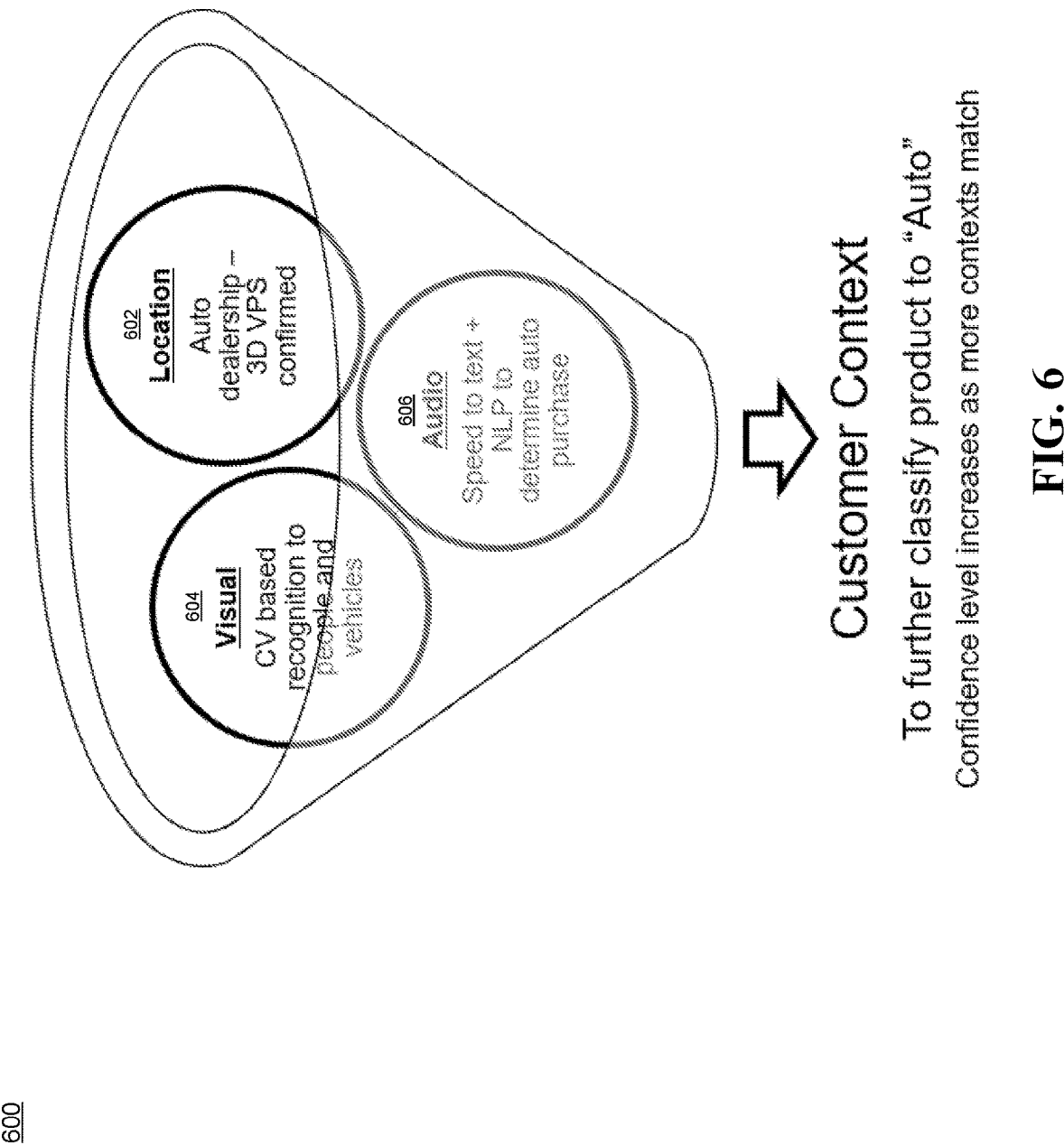
FIG. 6 illustrates an exemplary context identification output by the platform and language agnostic context-based recommendation module of FIG. 4 in accordance with an exemplary embodiment.

FIG. 6 illustrates an exemplary context identification 600 output by the platform and language agnostic CBRM 406 of FIG. 4 in accordance with an exemplary embodiment. Referring back to FIGS. 4 and 5, in this exemplary use case, the CBRM 406 have determined based on the context data, that the customer 502 may be shopping for a new automobile. Such context data may be obtained from location data 602 of the customer 502 using the GPS 510, visual data 604 of the customer 502 using the VPS 512, and audio data 606 of the customer 502 using the audio context block 508. The location data 602 may identify that the customer is at an auto dealership confirmed by the three-dimensional (3D) VPS data outputted by the VPS 512. The visual data 604 may include CV based recognition to people and vehicles (i.e., automobiles) outputted by the CV block 516. The audio data 606 may include natural language processing of a conversation between the customer 502 and an auto dealer to determine that the customer 502 is trying to purchase an automobile. The audio data may be outputted by the audio context block 508 and the NLP block 518. Thus, the customer context data is used to further classify recommended product to "auto". The confidence level of classification as more contexts match is matched by the CBRM 406.

Figure 7:
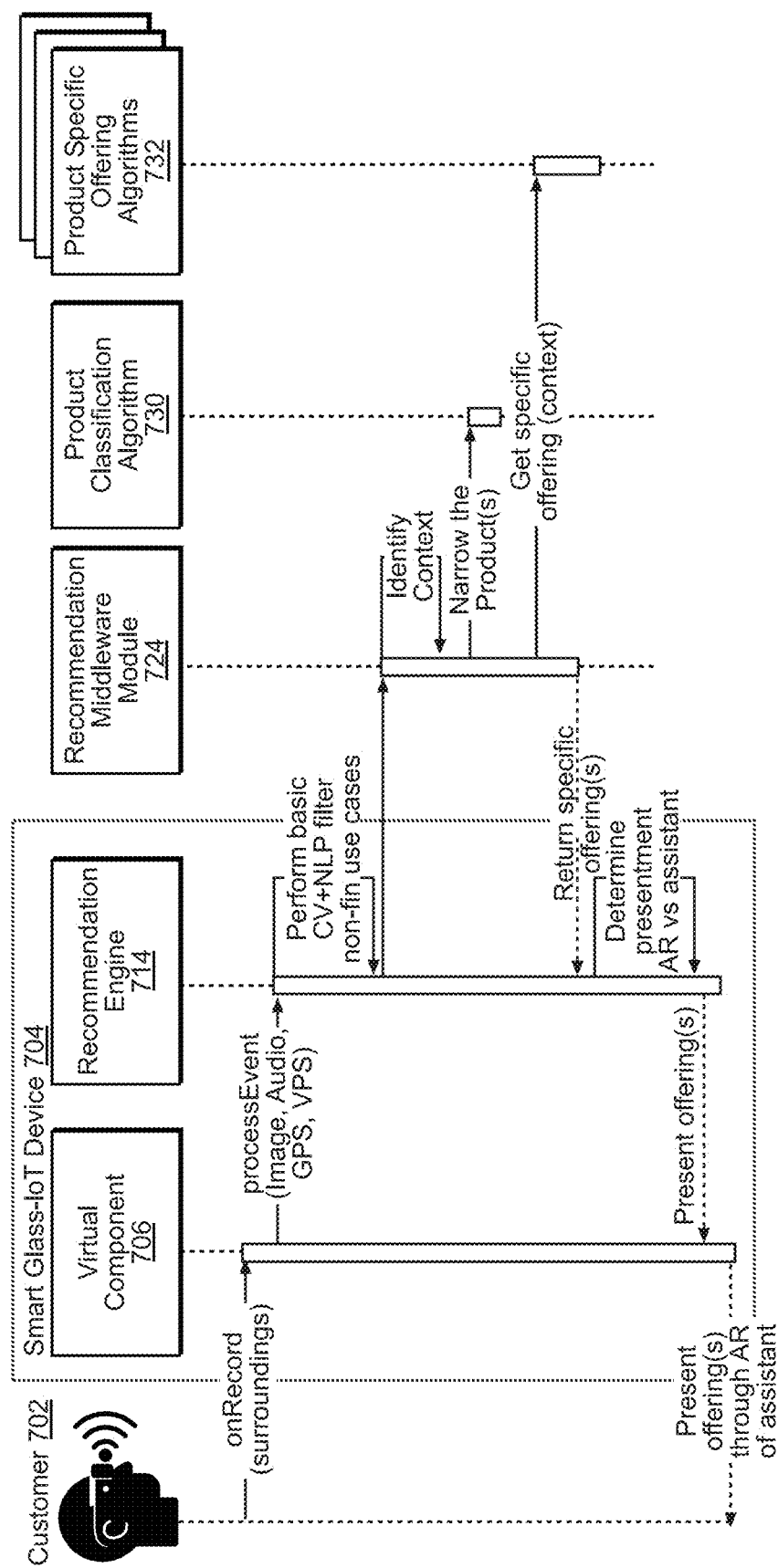
FIG. 7 illustrates an exemplary sequence diagram implemented by the platform and language agnostic context-based recommendation module of FIG. 4 in accordance with an exemplary embodiment.

FIG. 7 illustrates an exemplary sequence diagram 700 implemented by the platform and language agnostic CBRM 406 of FIG. 4 in accordance with an exemplary embodiment. As illustrated in FIG. 7, the sequence diagram 700 may include an IoT device block 704 that may include a virtual component 706 and a recommendation engine 714. The IoT device block 704 may be embedded within an IoT device wearable by the customer 702 The sequence diagram 700 may also include a recommendation middleware module 724, a product classification algorithm 730, and a product specific offering algorithms 732.

Referring back to FIGS. 4-7, according to exemplary embodiments, the communication module 426 may be configured to establish a communication link between the application 403 and one or more IoT devices 405. The one or more IoT devices 405 may be configured to be wearable by the customer 502, 702 having an account relationship with an institution.

According to exemplary embodiments, the receiving module 414 may be configured to receive input data from said one or more IoT devices. The assessing module 416 may be configured to assess surroundings of the customer 502, 702 based on the received input data. The generating module 418 may be configured to generate surroundings data based on the assessed surroundings of the customer 502, 702. The generating module 418 may also be configured to generate customer context data based on the received input data and the surroundings data.

According to exemplary embodiments, the implementing module 420 may be configured to implement a classification algorithm 530 to identify products with matching offerings provided by the institution corresponding to the generated customer context data. The receiving module 414 may be further configured to receive input corresponding to customer consent to receive the identified products. The GUI 428 may be configured to display, in response to receiving the customer consent, the identified products onto the application 403 via a predefined communication channel (i.e., VR assistant 522 channel or AR module 520 channel).

According to exemplary embodiments, the input data may include one or more of the following data: sensory inputs data, positional data, and contexts data, but the disclosure is not limited thereto.

According to exemplary embodiments, the institution may be a financial institution, and the filtering module 422 may be configured to filter non-financial use cases data prior to generating the customer context data.

According to exemplary embodiments, in assessing the surroundings of the customer, the integrating module 424 may be configured to integrate a plurality of data each received from a corresponding communication channel of the one or more IoT devices 405, 504, 704.

According to exemplary embodiments, the one or more IoT devices 405, 504, 704 may include smart glasses with embedded cameras, and the receiving module 414 may be further configured to receive video feed data of the surroundings of the customer 502, 702 from the smart glasses.

According to exemplary embodiments, the one or more IoT devices 405, 504, 704 may include a GPS 510 device, and the receiving module 414 may be further configured to: receive customer location data from the GPS 510 device.

According to exemplary embodiments, the one or more IoT devices 405, 504, 704 may include a VPS 512 device configured to provide imagery-based positioning data of the customer 502, 702, and the receiving module 414 may be further configured to: receive VPS 512 data of the customer 502, 702 from the VPS 512 device based on imagery of the surroundings of the customer 502, 702.

According to exemplary embodiments, the one or more IoT devices 405, 504, 704 may include smart wearable Bluetooth headphones with pre-determined image recognition capabilities and executable natural language processing pattern recognition algorithms, but the disclosure is not limited thereto.

According to exemplary embodiments, the application 403 may be running natively on each of said one or more IoT devices 405, 504, 704. The application 403 may also include the CBRM 406.

According to exemplary embodiments, in generating the surroundings data, the implementing module 420 may be further configured to implement an NLP algorithm executed by the NLP block 518 on assessed surroundings data of the customer 502. 702 received through the one or more IoT devices 405, 504, 704.

According to exemplary embodiments, the implementing module 420 may be further configured to implement one or more of the product specific regression algorithms 532 to obtain specific product offerings corresponding to the identified products.

According to exemplary embodiments, the predefined communication channel may include one or more of the following channels: augmented reality communication channel, virtual assistant communication channel; push notifications communication channel, and audio communication channel of the IoT devices 405, 504, 704, but the disclosure is not limited thereto.

Similar algorithms as illustrated in FIGS. 5-7 may be implemented by the CBRM 406/application 403 to identify that the customer 502, 702 is going to an open house (boards). The CBRM 406/application 403 may interface with the financial institution (i.e., bank) and may propose home loan products to the customer 502, 702 via the communication channel of the IoT devices 405, 504, 704.

Similarly, algorithms as illustrated in FIGS. 5-7 may be implemented by the CBRM 406/application 403 to identify that the customer 502, 702 is shopping for an automobile. The CBRM 406/application 403 may interface with the financial institution (i.e., bank) and may propose auto loan products to the customer 502, 702 via the communication channel of the IoT devices 405, 504, 704.

Similarly, algorithms as illustrated in FIGS. 5-7 may be implemented by the CBRM 406/application 403 to identify that the customer 502, 702 is applying for colleges. The CBRM 406/application 403 may interface with the financial institution (i.e., bank) and may propose college loan products to the customer 502, 702 via the communication channel of the IoT devices 405, 504, 704.

Similarly, algorithms as illustrated in FIGS. 5-7 may be implemented by the CBRM 406/application 403 to identify that the customer 502, 702 is at a grocery store or a movie theater. The CBRM 406/application 403 may interface with the financial institution (i.e., bank) and may propose partner discount products corresponding to the grocery store or movie theater to the customer 502, 702 via the communication channel of the IoT devices 405, 504, 704.

According to exemplary embodiments, the above-described use cases such as home loan, auto loan, student loan, store/movie ticket discounts are for examples only, but the disclosure is not limited thereto. The algorithms illustrated in FIGS. 5-7 may be implemented by the CBRM 406/application 403 to provide other product specific recommendations to the customer 502, 702 via the communication channel of the IoT devices 405, 504, 704 based on other identified use cases.

Figure 8:
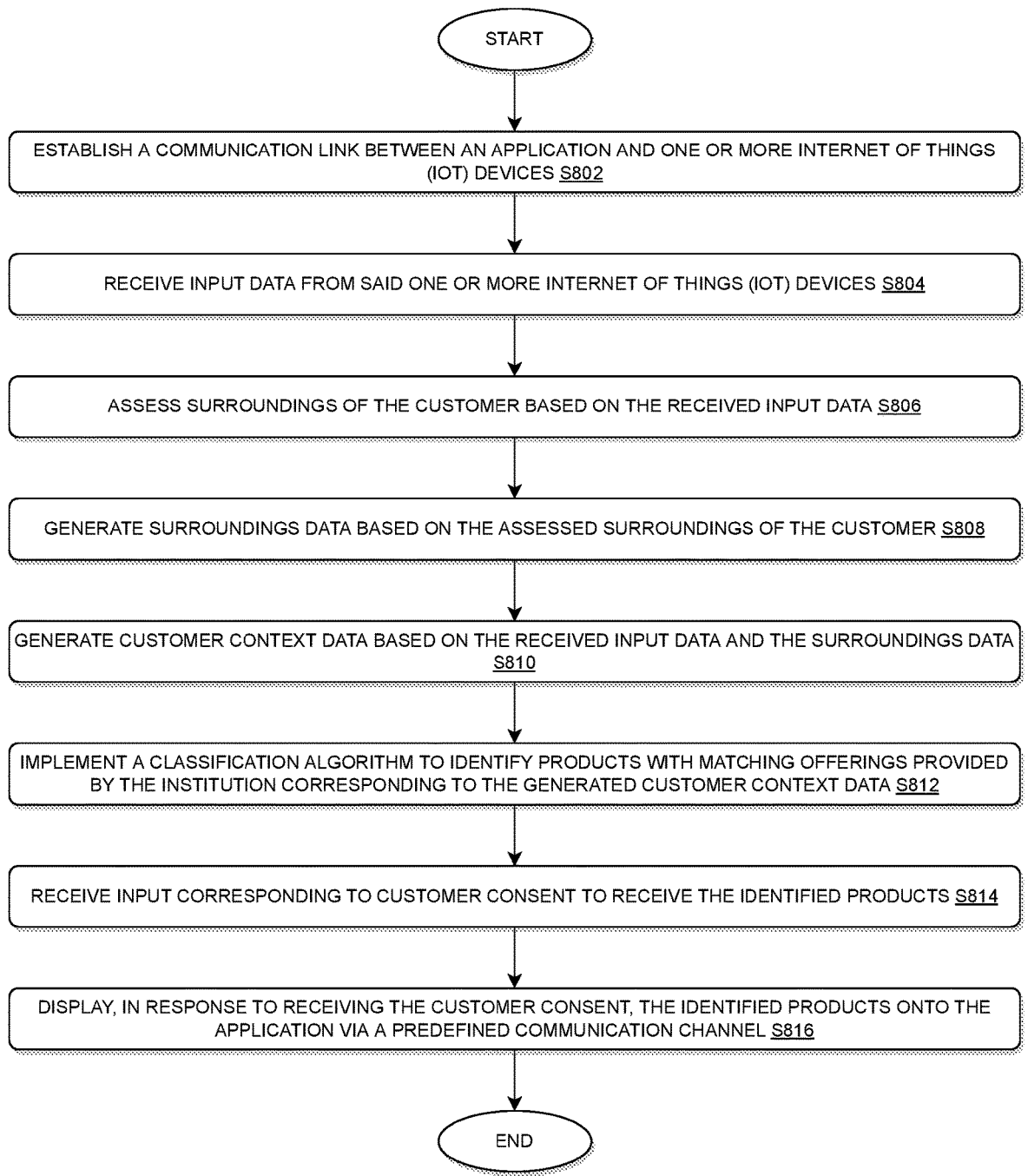
FIG. 8 illustrates an exemplary flow chart implemented by the platform and language agnostic context-based recommendation module of FIG. 4 for automatically predicting customer's need and providing specific product recommendations through video/image recognition and natural language processing of the surroundings in accordance with an exemplary embodiment.

FIG. 8 illustrates an exemplary flow chart 800 implemented by the CBRM 408 of FIG. 4 for automatically predicting customer's need and providing specific product recommendations through video/image recognition and natural language processing of the surroundings in accordance with an exemplary embodiment. It will be appreciated that the illustrated process 800 and associated steps may be performed in a different order, with illustrated steps omitted, with additional steps added, or with a combination of reordered, combined, omitted, or additional steps.

As illustrated in FIG. 8, at step S802, the process 800 may include establishing a communication link between an application and one or more Internet of Things (IoT) devices, wherein the one or more IoT devices are configured to be wearable by a customer having an account relationship with an institution.

At step S804, the process 800 may include receiving input data from said one or more IoT devices.

At step S806, the process 800 may include assessing surroundings of the customer based on the received input data.

At step S808, the process 800 may include generating surroundings data based on the assessed surroundings of the customer.

At step S810, the process 800 may include generating customer context data based on the received input data and the surroundings data.

At step S812, the process 800 may include implementing a classification algorithm to identify products with matching offerings provided by the institution corresponding to the generated customer context data.

At step S814, the process 800 may include receiving input corresponding to customer consent to receive the identified products.

At step S816, the process 800 may include displaying, in response to receiving the customer consent, the identified products onto the application via a predefined communication channel.

According to exemplary embodiments, the institution may be a financial institution, and the process 800 may further include: filtering non-financial use cases data prior to generating the customer context data.

According to exemplary embodiments, in assessing the surroundings of the customer, the process 800 may further include: integrating a plurality of data each received from a corresponding communication channel of the one or more IoT devices.

According to exemplary embodiments, the one or more IoT devices may include smart glasses with embedded cameras, and the process 800 may further include: receiving video feed data of the surroundings of the customer from the smart glasses.

According to exemplary embodiments, the one or more IoT devices may include a global positioning device, and the process 800 may further include: receiving customer location data from the global positioning device.

According to exemplary embodiments, the one or more IoT devices may include a visual positioning device configured to provide imagery-based positioning data of the customer, and the process 800 may further include: receiving visual positioning data of the customer from the visual positioning device based on imagery of the surroundings of the customer.

According to exemplary embodiments, in generating the surroundings data, the process 800 may further include: implementing a natural language processing algorithm on assessed surroundings data of the customer received through the one or more IoT devices.

According to exemplary embodiments, the process 800 may further include: implementing a product specific regression algorithm to obtain specific product offering corresponding to the identified products.

According to exemplary embodiments, the CBRD 402 may include a memory (e.g., a memory 106 as illustrated in FIG. 1) which may be a non-transitory computer readable medium that may be configured to store instructions for implementing a CBRM 406 for automatically predicting customer's need and providing specific product recommendations through video/image recognition and natural language processing of the surroundings as disclosed herein. The CBRD 402 may also include a medium reader (e.g., a medium reader 112 as illustrated in FIG. 1) which may be configured to read any one or more sets of instructions, e.g., software, from any of the memories described herein. The instructions, when executed by a processor embedded within the CBRM 406, 506 or within the CBRD 402, may be used to perform one or more of the methods and processes as described herein. In a particular embodiment, the instructions may reside completely, or at least partially, within the memory 106, the medium reader 112, and/or the processor 104 (see FIG. 1) during execution by the CBRD 402.

According to exemplary embodiments, the instructions, when executed, may cause a processor embedded within the CBRM 406 or the CBRD 402 to perform the following: establishing a communication link between an application and one or more IoT devices, wherein the one or more IoT devices are configured to be wearable by a customer having an account relationship with an institution; receiving input data from said one or more IoT devices; assessing surroundings of the customer based on the received input data; generating surroundings data based on the assessed surroundings of the customer; generating customer context data based on the received input data and the surroundings data; implementing a classification algorithm to identify products with matching offerings provided by the institution corresponding to the generated customer context data; receiving input corresponding to customer consent to receive the identified products; and displaying, in response to receiving the customer consent, the identified products onto the application via a predefined communication channel. According to exemplary embodiments, the processor may be the same or similar to the processor 104 as illustrated in FIG. 1 or the processor embedded within CBRD 202, CBRD 302, CBRD 402, and CBRM 406, 506.

According to exemplary embodiments, the institution may be a financial institution, and the instructions, when executed, may cause the processor 104 to further perform the following: filtering non-financial use cases data prior to generating the customer context data.

According to exemplary embodiments, in assessing the surroundings of the customer, the instructions, when executed, may cause the processor 104 to further perform the following: integrating a plurality of data each received from a corresponding communication channel of the one or more IoT devices.

According to exemplary embodiments, the one or more IoT devices may include smart glasses with embedded cameras, and the instructions, when executed, may cause the processor 104 to further perform the following: receiving video feed data of the surroundings of the customer from the smart glasses.

According to exemplary embodiments, the one or more IoT devices may include a global positioning device, and the instructions, when executed, may cause the processor 104 to further perform the following: receiving customer location data from the global positioning device.

According to exemplary embodiments, the one or more IoT devices may include a visual positioning device configured to provide imagery-based positioning data of the customer, and the instructions, when executed, may cause the processor 104 to further perform the following: receiving visual positioning data of the customer from the visual positioning device based on imagery of the surroundings of the customer.

According to exemplary embodiments, in generating the surroundings data, the instructions, when executed, may cause the processor 104 to further perform the following: implementing a natural language processing algorithm on assessed surroundings data of the customer received through the one or more IoT devices.

According to exemplary embodiments, the instructions, when executed, may cause the processor 104 to further perform the following: implementing a product specific regression algorithm to obtain specific product offering corresponding to the identified products.

According to exemplary embodiments as disclosed above in FIGS. 1-8, technical improvements effected by the instant disclosure may include a platform for implementing a platform and language agnostic context-based recommendation module for automatically predicting customer's need and providing specific product recommendations through video/image recognition and natural language processing of the surroundings, thereby improving customer's experience and financial life, saving the customer's money and time to research and process, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for automatically providing context-based product recommendation by utilizing one or more processors along with allocated memory, the method comprising:
    establishing a communication link between an application and one or more Internet of Things (IoT) devices, wherein the one or more IoT devices are configured to be wearable by a customer having an account relationship with an institution, wherein the institution is a financial institution;
    receiving input data from said one or more IoT devices;
    assessing surroundings of the customer based on the received input data;
    generating surroundings data based on the assessed surroundings of the customer;
    generating customer context data based on the received input data and the surroundings data;
    implementing a classification algorithm to identify products with matching offerings provided by the institution corresponding to the generated customer context data;
    receiving input corresponding to customer consent to receive certain products from the identified products; and
    displaying, in response to receiving the customer consent, the certain products from identified products onto the application via a predefined communication channel.

2. The method according to claim 1, wherein the input data includes one or more of the following data: sensory inputs data, positional data, and contexts data.

3. The method according to claim 1, further comprising:
    filtering non-financial use cases data prior to generating the customer context data.

4. The method according to claim 1, wherein in assessing the surroundings of the customer, the method further comprising:
    integrating a plurality of data each received from a corresponding communication channel of the one or more IoT devices.

5. The method according to claim 4, wherein the one or more IoT devices include smart glasses with embedded cameras, and the method further comprising:
receiving video feed data of the surroundings of the customer from the smart glasses.

6. The method according to claim 4, wherein the one or more IoT devices include a global positioning device, and the method further comprising:
receiving customer location data from the global positioning device.

7. The method according to claim 4, wherein the one or more IoT devices include a visual positioning device configured to provide imagery-based positioning data of the customer, and the method further comprising:
receiving visual positioning data of the customer from the visual positioning device based on imagery of the surroundings of the customer.

8. The method according to claim 1, wherein the application is running natively on each of said one or more IoT devices.

9. The method according to claim 1, wherein in generating the surroundings data, the method further comprising:
implementing a natural language processing algorithm on assessed surroundings data of the customer received through the one or more IoT devices.

10. The method according to claim 1, wherein the predefined communication channel includes one or more of the following channels: augmented reality communication channel, virtual assistant communication channel; push notifications communication channel, and audio communication channel of the IoT devices.

11. The method according to claim 1, further comprising:
implementing a product specific regression algorithm to obtain specific product offering corresponding to the identified products.

12. The method according to claim 11, wherein the product specific algorithm includes one or more of the following algorithms: card algorithms, deposits algorithms, automobile algorithms, home loan algorithms, operations algorithms, and student loan algorithms.

13. A system for automatically providing context-based product recommendation, the system comprising:
a processor; and
a memory operatively connected to the processor via a communication interface, the memory storing computer readable instructions, when executed, causes the processor to:
establish a communication link between an application and one or more Internet of Things (IoT) devices, wherein the one or more IoT devices are configured to be wearable by a customer having an account relationship with an institution, wherein the institution is a financial institution;
receive input data from said one or more IoT devices;
assess surroundings of the customer based on the received input data;
generate surroundings data based on the assessed surroundings of the customer;
generate customer context data based on the received input data and the surroundings data;
implement a classification algorithm to identify products with matching offerings provided by the institution corresponding to the generated customer context data;
receive input corresponding to customer consent to receive certain products from the identified products; and
display, in response to receiving the customer consent, the certain products from identified products onto the application via a predefined communication channel.

14. The system according to claim 13, wherein the input data includes one or more of the following data: sensory inputs data, positional data, and contexts data.

15. The system according to claim 13, wherein the processor is further configured to:
filter non-financial use cases data prior to generating the customer context data.

16. The system according to claim 13, in assessing the surroundings of the customer, the processor is further configured to:
integrate a plurality of data each received from a corresponding communication channel of the one or more IoT devices.

17. The system according to claim 16, wherein the one or more IoT devices include smart glasses with embedded cameras, and the processor is further configured to:
receive video feed data of the surroundings of the customer from the smart glasses.

18. The system according to claim 16, wherein the one or more IoT devices include a global positioning device, and the processor is further configured to:
receive customer location data from the global positioning device.

19. A non-transitory computer readable medium configured to store instructions for automatically providing context-based product recommendation, wherein, when executed, the instructions cause a processor to perform the following:
establishing a communication link between an application and one or more Internet of Things (IoT) devices, wherein the one or more IoT devices are configured to be wearable by a customer having an account relationship with an institution, wherein the institution is a financial institution;
receiving input data from said one or more IoT devices;
assessing surroundings of the customer based on the received input data;
generating surroundings data based on the assessed surroundings of the customer;
generating customer context data based on the received input data and the surroundings data;
implementing a classification algorithm to identify products with matching offerings provided by the institution corresponding to the generated customer context data;
receiving input corresponding to customer consent to receive certain products from the identified products; and
displaying, in response to receiving the customer consent, the certain products from identified products onto the application via a predefined communication channel.

20. The non-transitory computer readable medium according to claim 19, wherein, when executed, the instructions cause the processor to further perform the following:
implementing a product specific regression algorithm to obtain specific product offering corresponding to the identified products,
wherein the product specific algorithm includes one or more of the following algorithms: card algorithms, deposits algorithms, automobile algorithms, home loan algorithms, operations algorithms, and student loan algorithms.

* * * * *